(12) United States Patent
Campagna et al.

(10) Patent No.: US 7,039,185 B2
(45) Date of Patent: May 2, 2006

(54) METHOD AND SYSTEM FOR SECURING A PRINTHEAD IN A CLOSED SYSTEM METERING DEVICE

(75) Inventors: Matthew J. Campagna, Ridgefield, CT (US); Frederick W. Ryan, Jr., Oxford, CT (US)

(73) Assignee: Pitney Bowes Inc., Stamford, CT (US)

( * ) Notice: Subject to any disclaimer, the term of this patent is extended or adjusted under 35 U.S.C. 154(b) by 426 days.

(21) Appl. No.: 09/971,273

(22) Filed: Oct. 3, 2001

(65) Prior Publication Data

US 2003/0081775 A1 May 1, 2003

(51) Int. Cl.
*H04L 9/00* (2006.01)

(52) U.S. Cl. .................. 380/43; 380/260; 380/265; 380/268

(58) Field of Classification Search .......... 380/43, 380/46, 260, 262, 264, 265, 268; 705/60, 705/61, 405; 768/252
See application file for complete search history.

(56) References Cited

U.S. PATENT DOCUMENTS

| 4,341,925 A | * | 7/1982 | Frosch et al. | ............. 380/262 |
| 4,629,871 A | | 12/1986 | Scribner et al. | |
| 4,639,548 A | | 1/1987 | Oshima et al. | |
| 4,641,346 A | | 2/1987 | Clark et al. | |
| 4,660,221 A | | 4/1987 | Dlugos | |
| 4,813,802 A | | 3/1989 | Gilham et al. | |
| 4,813,912 A | | 3/1989 | Chickneas et al. | |
| 4,934,846 A | | 6/1990 | Gilham | |
| 5,293,465 A | * | 3/1994 | Abumehdi et al. | ......... 358/1.14 |
| 5,579,485 A | * | 11/1996 | Edgar et al. | ................ 709/237 |
| 6,166,650 A | * | 12/2000 | Bruwer | ...................... 340/5.26 |
| 6,201,870 B1 | * | 3/2001 | Medard et al. | ............... 380/46 |

FOREIGN PATENT DOCUMENTS

| EP | 0376573 A2 | 7/1990 |
| EP | 0393896 A2 | 10/1990 |

\* cited by examiner

*Primary Examiner*—Thomas R. Peeso
*Assistant Examiner*—Grigory Gurshman
(74) *Attorney, Agent, or Firm*—Brian A. Lemm; Angelo N. Chaclas

(57) ABSTRACT

A closed system meter that secures the link between the accounting device and printer utilizing a Linear Feedback Shift Register (LFSR) based stream encryption is provided. The accounting device includes an LFSR that comprises a plurality of stages, with one or more taps that are passed through a logic gate to provide a "feedback" signal to the input of the LFSR, to generate a pseudo-random pattern output. Preferably, a Shrinking Key Generator (SKG) is utilized to further ensure privacy of the data. The output data from the accounting unit is encrypted utilizing the output from the LFSR and sent to the printing device. The printing device includes a similar LFSR, which is utilized to decrypt the output data from the accounting unit and enable printing.

37 Claims, 4 Drawing Sheets

METHOD AND SYSTEM FOR SECURING A PRINTHEAD IN A CLOSED SYSTEM METERING DEVICE

FIELD OF THE INVENTION

The invention disclosed herein relates generally to systems for evidencing postage payment, and more particularly to a method and system for securing the printhead in a closed system postage metering system.

BACKGROUND OF THE INVENTION

Postage metering systems have been developed which employ cryptographically secured information that is printed on a mailpiece as part of an indicium evidencing postage payment. The cryptographically secured information includes a postage value for the mailpiece combined with other postal data that relate to the mailpiece and the postage meter printing the indicium. The cryptographically secured information, typically referred to as a digital token or a digital signature, authenticates and protects the integrity of information, including the postage value, imprinted on the mailpiece for later verification of postage payment. Since the digital token incorporates cryptographically secured information relating to the evidencing of postage payment, altering the printed information in an indicium is detectable by standard verification procedures.

Presently, postage metering systems are recognized as either closed or open system devices. In a closed system device, the printer functionality is solely dedicated to metering activity. Examples of closed system metering devices include conventional digital and analog postage meters wherein a dedicated printer is securely coupled to a metering or accounting function device. In a closed system device, since the printer is securely coupled and dedicated to the meter, printing cannot take place without accounting. In an open system device, the printer is not dedicated to the metering activity. This frees the system and printer functionality for multiple and diverse uses in addition to the metering activity. Examples of open system metering devices include personal computer (PC) based devices with single/multi-tasking operating systems, multi-user applications and digital printers. An open system metering device includes a non-dedicated printer that is not securely coupled to a secure accounting module. An open system indicium printed by the non-dedicated printer is made secure by including addressee information in the encrypted evidence of postage printed on the mailpiece for subsequent verification.

The United States Postal Service ("USPS") has approved personal computer (PC) postage metering systems as part of the USPS Information-Based Indicia Program ("IBIP"). The IBIP is a distributed trusted system which is a PC based metering system that is meant to augment existing postage meters using new evidence of postage payment known as information-based indicia. The program relies on digital signature techniques to produce for each mailpiece an indicium whose origin can be authenticated and content cannot be modified. The IBIP requires printing a large, high density, two-dimensional ("2D") bar code on a mailpiece. The 2D bar code, which encodes information, includes a digital signature. A published draft specification, entitled "IBIP PERFORMANCE CRITERIA FOR INFORMATION-BASED INDICIA AND SECURITY ARCHITECTURE FOR OPEN IBI POSTAGE METERING SYSTEMS (PCIBI-O)," dated Apr. 26, 1999, defines the proposed requirements for a new indicium that will be applied to mail being created using IBIP. This specification also defines the proposed requirements for a Postal Security Device ("PSD") and a host system element (personal computer) of the IBIP. A PSD is a secure processor-based accounting device that is coupled to a personal computer to dispense and account for postage value stored therein to support the creation of a new "information-based" postage postmark or indicium that will be applied to mail being processed using IBIP.

In conventional closed system mechanical and electronic postage meters, a secure link is required between printing and accounting functions. For postage meters configured with printing and accounting functions performed in a single, secure box, the integrity of the secure box is monitored by periodic inspections of the meters. More recently, digital printing postage meters typically include a digital printer coupled to a PSD, and have removed the need for physical inspection by cryptographically securing the link between the accounting and printing mechanisms. In essence, new digital printing postage meters create a secure point-to-point communication link between the PSD and print head.

FIG. 1 illustrates in block diagram form a conventional closed system postage meter 10 comprising an accounting device 12 coupled to a printer 14 via a cable 16. Accounting device 12 includes a PSD 20 inside a secure enclosure 22. Printer 14 includes a printer driver 24 coupled to a printhead 26 inside a secure enclosure 28.

There are problems, however, with conventional closed system postage meters. The link between the accounting unit 12 and printer 14, i.e., cable 16, is vulnerable to attack. This link must be protected to deter an attacker from fraudulently driving the printer 14 and printing indicia for which payment has not actually been accounted for by PSD 20. Typically, there are three main attacks that must be protected against: (i) an attacker disconnecting the PSD 20 and directly driving the printer 14, (ii) an attacker recording the data communicated to the printer 14 by the PSD 20 and replaying the data to the same or another printer at a later time, and (iii) an attacker recording data communicated to the printer 14 from the PSD 20 and replaying it simultaneously to another printer at the same time as printer 14, also known as parallel printing.

In conventional closed meter systems, the link between the accounting device 12 and printer 14 has been either physically or cryptographically secured. Physical protection of the link is difficult to achieve, especially for meters in which the printhead 26 moves. Full protection of the link requires cryptographically securing the data. This is typically accomplished by fully encrypting the data, utilizing digital signatures, and/or utilizing message authentication codes (MACs). However, this requires significant computations to be performed on both sides of the link, i.e., at the PSD 20 and printer driver 24. As a result, costly cryptographic hardware must be employed, performance of the system must be decreased, or both.

Thus, there exists a need for a closed system postage meter that effectively secures the link between the PSD and printer that is both cost efficient and easy to implement.

SUMMARY OF THE INVENTION

The present invention alleviates the problems associated with the prior art and provides a method and system for securing the link between the accounting device and printer of a closed system meter that is cost efficient and easy to implement.

In accordance with the present invention, the link between the accounting device and printer of a closed system meter is secured utilizing a Linear Feedback Shift Register (LFSR) based stream encryption. The accounting device includes an LFSR that comprises a plurality of stages, with one or more taps that are passed through a logic gate to provide a "feedback" signal to the input of the LFSR, to generate a pseudo-random pattern output. Preferably, a Shrinking Key Generator (SKG) is utilized to further ensure privacy of the data. The output data from the accounting unit is encrypted utilizing the output from the LFSR and sent to the printing device. The printing device includes a similar LFSR, which is utilized to decrypt the output data from the accounting unit and enable printing.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
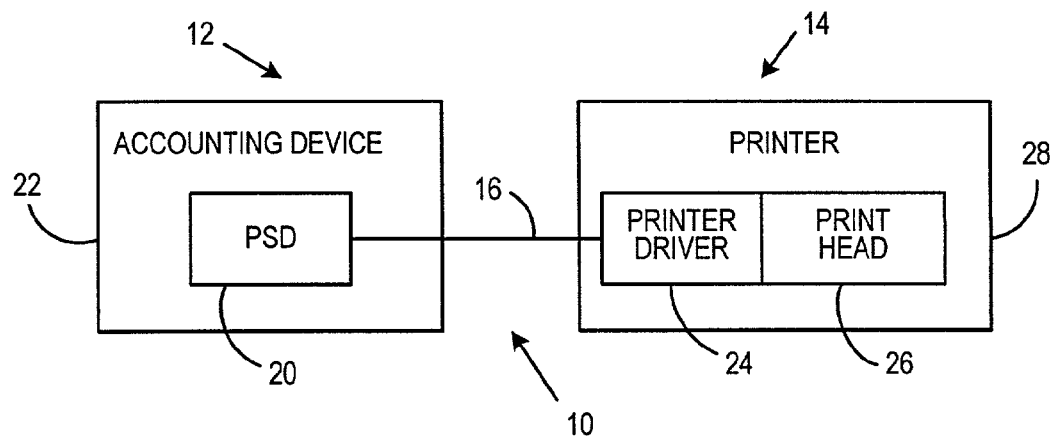
FIG. 1 illustrates in block diagram form a conventional closed system postage meter.
Figure 2:
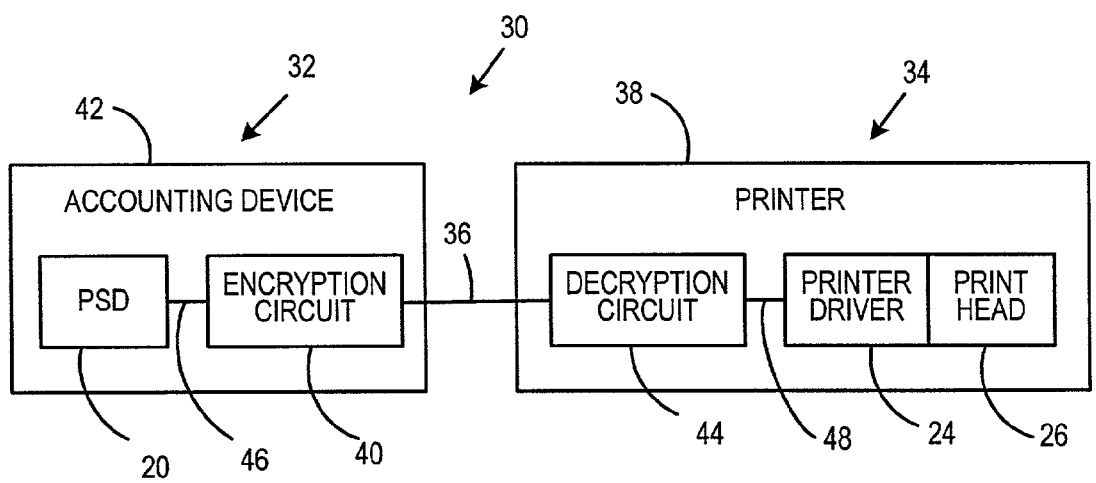
FIG. 2 illustrates in block diagram form a closed system postage meter according to the present invention.

In describing the present invention, reference is made to the drawings, wherein there is seen in FIG. 2 a closed system postage meter 30 according to the present invention. Meter 30 includes an accounting device 32 coupled to a printer 34 via a communication link, such as, for example, cable 36. Accounting device 32 includes a PSD 20 and an encryption circuit 40 inside a secure enclosure 42. Data from PSD is communicated to encryption circuit 40 via data link 46. It should be noted that while encryption circuit 40 is illustrated in FIG. 2 as being separate from PSD 20, the invention is not so limited and the encryption circuit 40 may be integral with PSD 20. The data from PSD 20 is encrypted by encryption circuit 40, as will be further described below, and the encrypted data sent to printer 34 via cable 36.

Printer 34 includes a printer driver 24 coupled to a printhead 26, and a decryption circuit 44 inside a secure enclosure 38. Encrypted data from accounting device 32 is input to decryption circuit 44, where it is decrypted as will be further described below. The decrypted data from decryption circuit 44 is then communicated to printer driver 24 via data link 48. It should be noted that while decryption circuit 44 is illustrated in FIG. 2 as being separate from printer driver 24, the invention is not so limited and the decryption circuit 44 may be integral with printer driver 24. Printer driver 24 then drives the printhead 26 based on the data from accounting device 32.

Figure 3A:
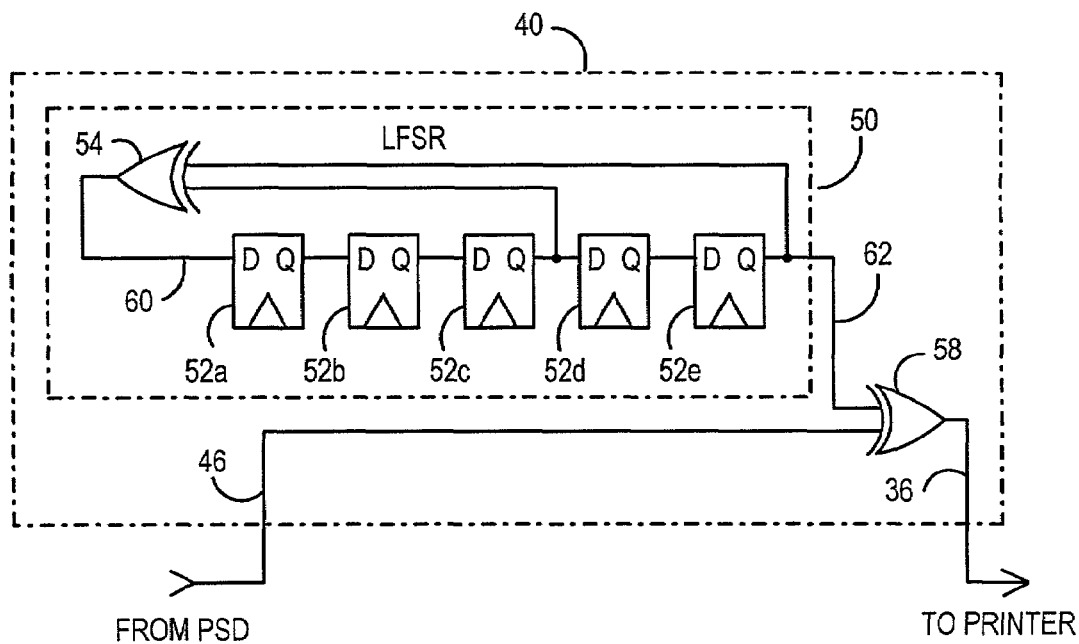
FIGS. 3A and 3B illustrate in block diagram form an embodiment for the encryption/decryption circuits utilized in FIG. 2.

FIG. 3A illustrates in block diagram form an encryption circuit 40 according to one embodiment of the present invention. Encryption circuit 40 includes a Linear Feedback Shift Register (LFSR) 50 that generates a pseudo-random sequence, i.e., although the sequence is pseudo-randomly generated, it will be periodic in nature. LFSR 50 comprises of a plurality of stages of register, such as, for example, flip-flops 52a–52e, and an exclusive OR (XOR) gate 54. The output 60 of XOR gate 54 is input to the first flip-flop 52a. The output of each flip-flop 52a–52d is input to the next succeeding flip-flop 52b–52e. The inputs for XOR gate 54 are provided by taps from the outputs of two or more of the flip-flops 52a–52e, such as, for example, the outputs from flip-flops 52c and 52e as illustrated in FIG. 3A. It should be understood that while five flip-flops 52a–52e are illustrated in FIG. 3A, the invention is not so limited and any number of flip-flops can be used. Additionally, any number and/or location of taps can be used for the inputs to XOR gate 54.

The output 62 from the last flip-flop 52e of LSFR 50 is input to an XOR gate 58. Data from the PSD 20 is also input to XOR gate 58 via data link 46. The output from XOR gate 58 is sent to printer 34 via cable 36.

Figure 3B:
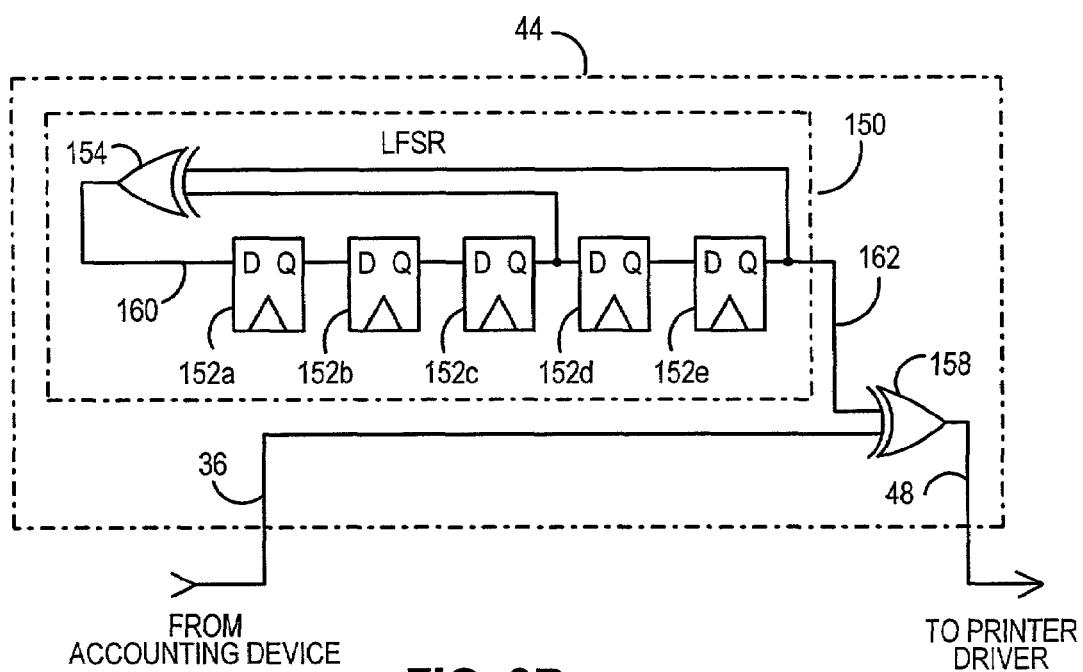

FIG. 3B illustrates in block diagram form a decryption circuit 44 that corresponds to encryption circuit 40. Decryption circuit 44 is similar to encryption circuit 40, and includes an LFSR 150. LFSR 150 is similar to LFSR 50 utilized in encryption circuit 40, and comprises of a plurality of stages of register, such as, for example, flip-flops 152a–152e, and an exclusive OR (XOR) gate 154. The output 160 of XOR gate 154 is input to the first flip-flop 152a. The output of each flip-flop 152a–152d is input to the next succeeding flip-flop 152b–152e. The inputs for XOR gate 154 are provided by taps from the outputs of two or more of the flip-flops 152a–152e, utilizing the same taps as in encryption circuit 40. The output 162 from the last flip-flop 152e of LSFR 150 in decryption circuit 44 is input to an XOR gate 158. The encrypted data from accounting device 32 on cable 36 is also input to XOR gate 158. The output from XOR gate 158 is sent to printer driver 24 via communication link 48.

The operation of the meter 30 is as follows. The goals of a cryptographic link between the accounting unit 32 and printer 34 is to deter replay of previously printed data, i.e., indicia, to the same or another printer, to detect modification of data sent to the printer, and to prevent simultaneous parallel printing of an indicium. To accomplish these goals, there are two elements that must be accomplished. First, the privacy of the data must be ensured, and second, the freshness of the data must be ensured. Ensuring the privacy of the data is accomplished by encrypting the data at the accounting device 32 and decrypting the data at the printer 34. When an indicium is generated for printing, the PSD 20 of accounting device 32 performs the accounting functions for the indicium and generates data to drive printer 34 to print the indicium. The data from PSD 20 is sent to encryption circuit 40 where each bit is passed through XOR gate 58 along with a bit of the pseudo-random sequence generated by LSFR 50. Accordingly, the data from PSD 20 is encrypted before being sent to printer 34. Table 1 below illustrates an example of the encryption for a portion of an exemplary data sequence from PSD and an exemplary pseudo-random sequence generated by LFSR 50.

TABLE 1

| PSD Data | 1 | 1 | 0 | 1 | 1 | 0 | 1 | 0 | 1 | 0 | 1 | 1 | 0 | 1 |
|---|---|---|---|---|---|---|---|---|---|---|---|---|---|---|
| Pseudo-Random Sequence | 0 | 0 | 0 | 0 | 1 | 0 | 0 | 0 | 1 | 0 | 0 | 1 | 0 | 1 |
| Output of Accounting Device | 1 | 1 | 0 | 1 | 0 | 0 | 1 | 0 | 0 | 0 | 1 | 0 | 0 | 0 |

As shown in Table 1, the data sent from accounting device 32 to printer 34 is different than the data generated by PSD 20. Although many bits of data from PSD 20 remain the same as the data output from accounting device 32 in the above example, e.g., the first, second third, fourth, sixth, seventh, eighth, tenth, eleventh and thirteenth bits, replay or parallel printing of the data sent from accounting device 32 produces an unusable image. Thus, the goal of preventing such replay or parallel printing has been accomplished. Any printer that is unable to decrypt the data before printing will only be able to print an unusable image. Therefore, even encrypting a small portion of the data, such as, for example, every fourth bit or every other bit, will provide an extremely high probability that the data replayed on another printer or printed in parallel would produce an unusable image.

The encrypted data from accounting device 32 is sent to printer 34 and input to decryption circuit 44 for decryption before being sent to printer driver 24. The data from accounting device 32 is input to an XOR gate 158 along with a bit of the pseudo-random sequence generated by LSFR 150 of decryption circuit 44. To ensure that the data is decrypted properly, LSFR 150 of decryption circuit 44 must generate the same pseudo-random sequence that LSFR 50 of encryption circuit 40 utilized to encrypt the data. This is accomplished by controlling the initial value of each LFSR 50, 150, also called the initial fill value. Different initial fill values will produce different outputs. It should be noted, however, that since each LFSR 50, 150 generates only a pseudo-random sequence, different initial fill values will only shift the starting point of the sequential pattern. Thus, if a decryption circuit 44 does not have the same initial fill value as encryption circuit 40, it will be unable to correctly decrypt the data from accounting device 32, and printer 34 will print an unusable image.

To ensure that LFSR 50 of encryption circuit 40 and LFSR 150 of decryption circuit 44 utilize the same initial fill value, a key agreement process, to establish the initial fill value, is performed between the printer 34 and accounting device 32. Preferably, this process is performed on demand to ensure that accounting device 32 and printer 34 can synchronize if a session between them is interrupted or if accounting device 32 is connected to a new printer. The key agreement process must also ensure that it is highly unlikely that two printers connected in parallel will arrive at the same initial fill value. Accordingly, it is preferable that printer 34 generate at least a portion of the initial fill value. This will also help prevent replay attacks, since if the initial fill value is simply sent to the printer 34 then a replay attack is possible by recording the initial fill value and data sent by accounting device 32 and sending the same initial fill value and data to another printer.

The preferred embodiment of a key agreement process according to the present invention operates as follows. It should be noted, however, that any key agreement protocol could be used to agree upon an initial fill. During manufacturing of the printer 34, it is assigned a serial number and a key that is algorithmically derived from the assigned serial number. For example, the serial number could be encrypted utilizing a Triple Data Encryption Standard (3DES) encryption method to generate the assigned key. This encryption would be performed with a Master Print Key. Thus, each printer would have a unique serial number and accordingly unique key. Accounting unit 32 would be provided with the means to generate the key for all printers, i.e., the Master Print Key. To agree upon an initial fill value, printer 34 will generate a random number greater than zero to use as the initial fill value for LFSRs 50, 150. The initial fill value will be loaded into LFSR 150 of decryption circuit 44. Printer 34 will then encrypt the generated random number using its key, and send the encrypted result and its assigned serial number to accounting device 32. Accounting device 32 will determine the printer key from the printer serial number, utilizing the Master Print Key, and then decrypt the encrypted random number from printer 34 with the determined printer key. The decrypted random number will then be loaded into the LFSR 50 of encryption circuit 40 as the initial fill value, and the data encrypted based on the loaded initial fill value. Decryption circuit 44 can then decrypt the data from accounting device 32, utilizing the same initial fill value that encryption circuit 40 used to encrypt the data, and send the decrypted data to printer driver 24 for printing by printhead 26. It should be noted that how often a new initial fill value needs to be agreed upon will depend upon the system requirements and the period of the LFSRs 50, 150. Thus, a new initial fill value could be generated for example, once a day, once a week, every time a print activity is to occur, or any other time desired.

As noted above, the data from accounting device 32 is decrypted by inputting the data to an XOR gate 158 along with a bit of the pseudo-random sequence generated by LSFR 150 of decryption circuit 44. Table 2 below illustrates an example of the decryption for the data sequence illustrated in Table 1.

TABLE 2

| Data from Accounting Device | 1 | 1 | 0 | 1 | 0 | 0 | 1 | 0 | 0 | 0 | 1 | 0 | 0 | 0 |
|---|---|---|---|---|---|---|---|---|---|---|---|---|---|---|
| Pseudo-Random Sequence | 0 | 0 | 0 | 0 | 1 | 0 | 0 | 0 | 1 | 0 | 0 | 1 | 0 | 1 |

TABLE 2-continued

| Output of Decryption Circuit | 1 | 1 | 0 | 1 | 1 | 0 | 1 | 0 | 1 | 0 | 1 | 1 | 0 | 1 |
|---|---|---|---|---|---|---|---|---|---|---|---|---|---|---|

Thus, as illustrated in Table 2, since the pseudo-random sequence generated by LFSR 150 is identical to the pseudo-random sequence generated by LFSR 50, the data from accounting device 32 will be properly decrypted and the data sent to the printer driver 24 from the decryption circuit 44 will be identical to the data sent from PSD 20 to encryption circuit 40. Accordingly the image produced by printhead 26 will be a usable image. However, the data sent from accounting device 32 to printer 34 via cable 36 will encrypted. Thus, if a printer does not have an LFSR that is identical to LFSR 50 of encryption circuit 40 and does not have the proper initial fill value, the printer will not be able to decrypt the data correctly and will print an unusable image.

While the encryption circuit 40 and decryption circuit 44 illustrated in FIGS. 3A and 3B provide a secure link between the accounting device 32 and printer 34 utilizing cost effective circuitry that is easy to implement, the secure link may still be vulnerable to attack. For example, linear feedback shift registers are vulnerable to attack based on the Berlekamp-Massey algorithm. The Berlekamp-Massey algorithm computes the linearity of a keystream and can recover the length of the LFSR, the placement of the tapped bits, and the initial fill value. To prevent such recovery, and therefore further ensure the security of the link between the accounting device 32 and printer 34, a Shrinking Key Generator (SKG) is used as described below.

Figure 4A:
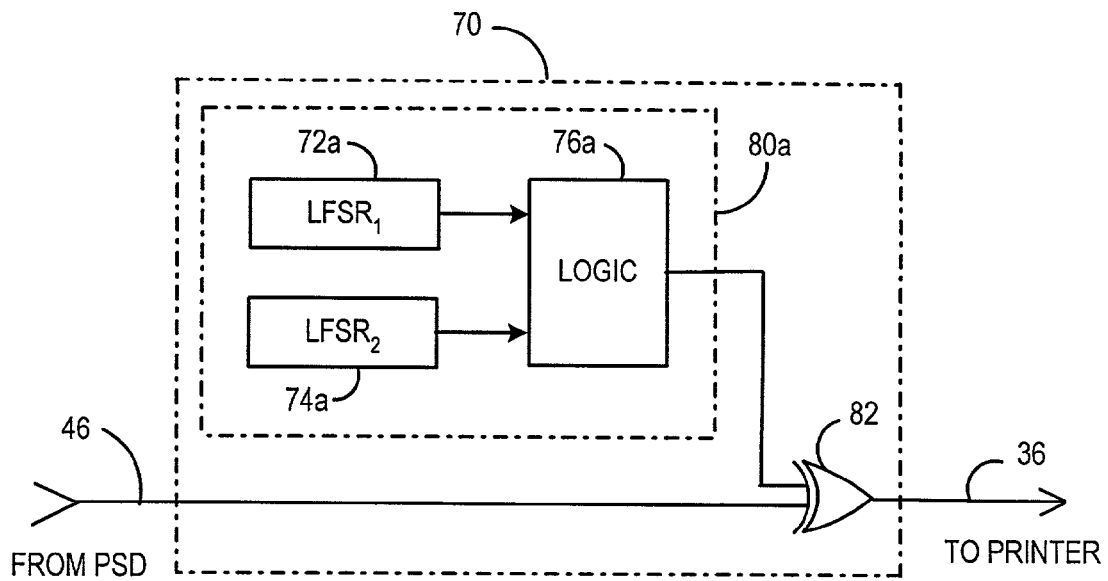
FIGS. 4A and 4B illustrate in block diagram form another embodiment for the encryption/decryption circuits utilized in FIG. 2.
Figure 4B:
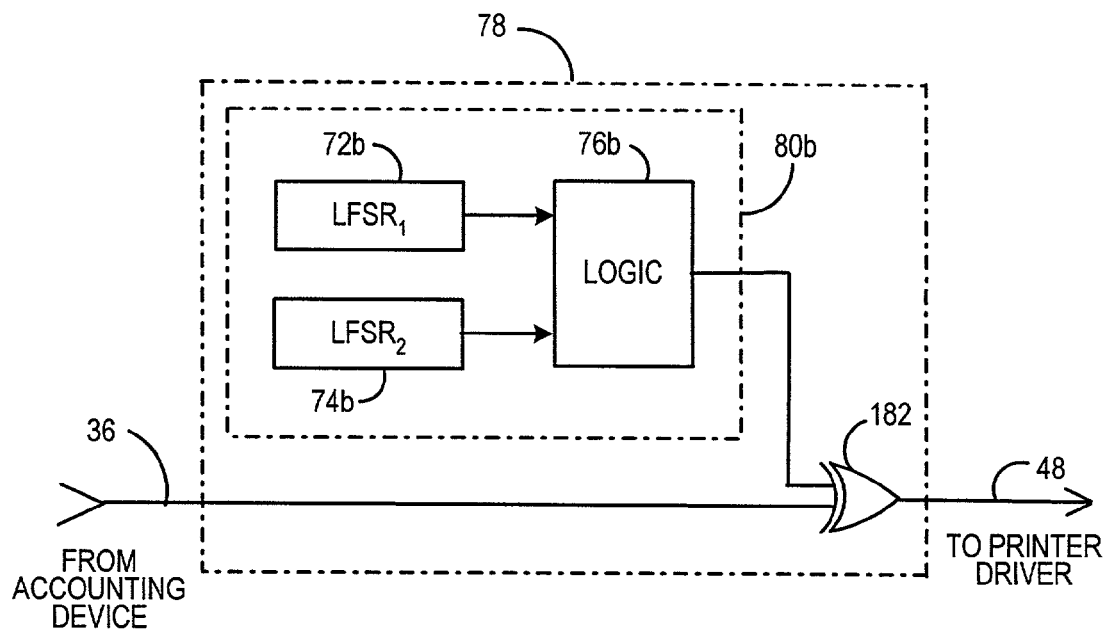

FIGS. 4A and 4B illustrate in block diagram form another embodiment for the encryption/decryption circuits utilized in FIG. 2. FIG. 4A illustrates an encryption circuit 70 that includes a shrinking key generator (SKG) 80a to encrypt the data. SKG 80a includes a pair of $LFSR_s$, i.e., $LFSR_1$ 72a and $LFSR_2$ 74a, and logic circuitry 76a. Each of $LFSR_1$ 72a and $LFSR_2$ 74a includes a plurality of stages of flip-flops and an exclusive OR gate as previously described with respect to LSFR 50 of FIG. 3A. Preferably, $LFSR_1$ 72a and $LFSR_2$ 74a are distinct from each other, i.e., they are different in that, for example, they do not include the same number of registers, have a different number or location of the taps for the feedback, or any combination thereof. The output from each of $LFSR_1$ 72a and $LFSR_2$ 74a is input to logic circuitry 76a. The output of logic circuitry 76a is input to XOR gate 82, along with the data from PSD 20 via communication link 46. The output from XOR gate 82 is sent to printer 34 via cable 36.

FIG. 4B illustrates a decryption circuit 78 that utilizes a shrinking key generator 80b, similar to SKG 80a of encryption circuit 70, to decrypt the data sent from accounting device 32. SKG 80b includes a pair of LFSRs, i.e., $LFSR_1$ 72b and $LFSR_2$ 74b, and logic circuitry 76b. $LFSR_1$ 72b is similar to $LFSR_1$ 72a of SKG 80a, and $LFSR_2$ 74b is similar to $LFSR_2$ 74a of SKG 80a. The output from each of $LFSR_1$ 72b and $LFSR_2$ 74b is input to logic circuitry 76b, which is similar to logic circuitry 76a of SKG 80a. The output of logic circuitry 76b is input to XOR gate 182, along with the data from accounting device 32 via cable 36. The output from XOR gate 182 is sent to printer driver 24 via communication link 48.

The operation of the encryption circuit 70 and decryption circuit 78 is as follows. An initial fill value for each of $LFSR_1$ 72a, 72b and $LFSR_2$ 74a, 74b is determined similarly as previously described. The initial fill value for $LFSR_1$ 72a of SKG 80a and $LFSR_1$ 72b of SKG 80b must be identical, as must the initial fill value for $LFSR_1$ 74a of SKG 80a and $LFSR_1$ 74b of SKG 80b. However, the initial fill value utilized between the pairs, i.e., $LFSR_1$ 72a, 72b and $LFSR_2$ 74a, 74b, may be different or similar. Each of $LFSR_1$ 72a and $LFSR_2$ 74a is going to generate a pseudo-random sequence, based on their respective initial fill values, which is input to logic circuitry 76a. As will be described below, portions of the pseudo-random sequence generated by $LFSR_1$ 72a will be used to encrypt the data from PSD 20 as determined by the pseudo-random sequence generated by $LFSR_2$ 74a.

Figure 5:
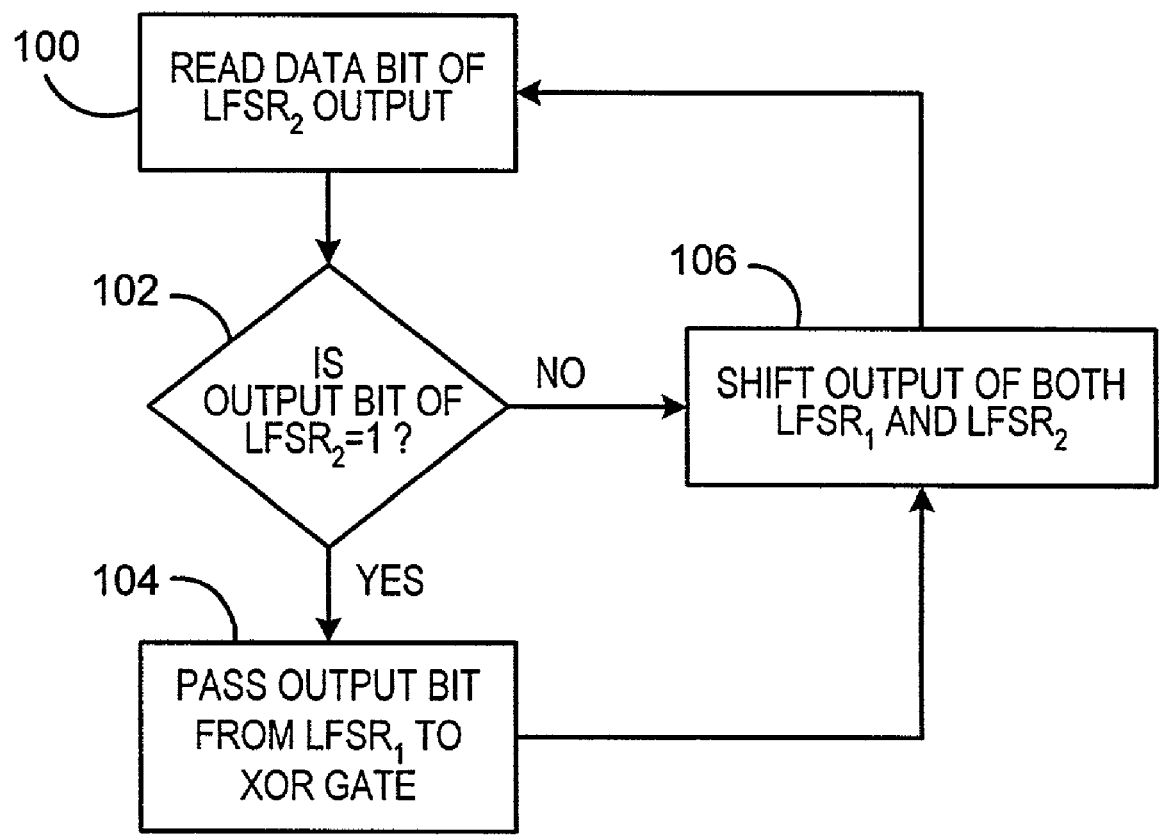
FIG. 5 illustrates in flow chart form a process for using a Shrinking Key Generator (SKG) to encrypt data according to the present invention.

FIG. 5 illustrates in flow chart form an exemplary method for determining which portions of the pseudo-random sequence generated by $LFSR_1$ 72a will be used to encrypt the data from PSD 20 based on the pseudo-random sequence generated by $LFSR_2$ 74a. In step 100, a data bit of the pseudo-random sequence generated by $LFSR_2$ 74a is read by logic circuitry 76a. In step 102, logic circuitry 76a determines if the read data bit of the pseudo-random sequence generated by $LFSR_2$ 74a is a "1." If the read data bit of the pseudo-random sequence generated by $LFSR_2$ 74a is a "1," then in step 104 the corresponding data bit of the pseudo-random sequence generated by $LFSR_1$ 72a will be passed through logic circuitry 76a to XOR gate 82 as an input along with the data from PSD 20. In step 106 the pseudo-random sequence from each of $LFSR_1$ 72a and $LFSR_2$ 74a will be shifted to the next data bit, and the process will repeat. If in step 102 it is determined that the current data bit of the pseudo-random sequence generated by $LFSR_2$ 74a is not a "1," i.e., it is a "0," then the method proceeds directly to step 106 where the pseudo-random sequence from each of $LFSR_1$ 72a and $LFSR_2$ 74a will be shifted to the next data bit without passing the corresponding data bit of the pseudo-random sequence generated by $LFSR_1$ 72a through logic circuitry 76a to XOR gate 82. Thus, not every bit of data generated by $LFSR_1$ 72a will be used to encrypt the data from PSD 20, thereby preventing an attack of encryption circuit 70 utilizing the Berlekamp-Massey algorithm.

The encrypted data from accounting device 32 is sent to printer 34 and input to decryption circuit 78 for decryption before being sent to printer driver 24. The data from accounting device 32 is input to an XOR gate 182 along with a bit of the pseudo-random sequence generated by SKG 80b of decryption circuit 78. Since SKG 80b is similar to SKG 80a, the output from SKG 80b will be identical to the output of SKG 80a, and accordingly the data from accounting device 32 will be properly decrypted by passing the output of SKG 80b and the data from accounting device 32 through XOR gate 182. Thus, the decrypted data sent to the printer driver 24 from the decryption circuit 78 will be identical to the data sent from PSD 20 to encryption circuit 70. Accordingly the image produced by printhead 26 will be a usable image. However, the data sent from accounting device 32 to printer 34 via cable 36 will be encrypted. Thus, if a printer does not have an SKG that is identical to SKG 80a of encryption circuit 70 and does not have the proper initial fill values utilized for each of $LFSR_1$ 72a and $LFSR_2$ 74a, the printer will not be able to decrypt the data correctly and will print an unusable image.

It should be noted that the use of SKG 80a and SKG 80b could potentially slow down the printing operation if it is necessary to wait for data. On the average, each of SKG 80a, 80b will require two steppings of $LFSR_1$ 72a and $LFSR_2$ 74a and $LFSR_1$ 72b and $LFSR_2$ 74b, respectively, to generate one output bit. In the worst case, a maximum of n−1 steps would be required, where n is the number of stages in $LFSR_1$ 72a, 72b. Accordingly, to maintain efficient operation of the entire system, it is desirable to increase the clock speed of each of SKG 80a, 80b to account for those data bits output from LFSR1 72a, 72b that are not passed to the respective XOR gates 82, 182.

Thus, according to the present invention, the link between the accounting device and printer of a closed system meter is secured utilizing a Linear Feedback Shift Register (LFSR) based stream encryption that is both cost efficient and easy to implement. It should be noted that while the above invention has been described with respect to encrypting/decrypting the data from the accounting device 32 to the printer 34, the invention is not so limited. For example, the encryption/decryption circuits according to the present invention could also be employed to encrypt/decrypt printer control signals. If the printer data is formatted by a printer driver integral to accounting device 32, and the only signals sent to the printhead 26 are control signals, e.g., print strobes, one or more of the control signals could be encrypted/decrypted utilizing the circuits described with respect to FIGS. 3–5 above. Any attempt to replay the encrypted print control signals or improperly decrypted print control signals will cause the printer to behave erratically and print an unusable image.

Additionally, while the encryption/decryption circuits of the present invention were described with respect to hardware implementation, i.e., shift registers and logic gates, the present invention is not so limited and one or more of the encryption/decryption circuits of the present invention may also be implemented in software.

It should be understood that although the present invention was described with respect to a postage metering system, the present invention is not so limited and is applicable to any type of value metering system or controlled printing environment. While a preferred embodiment of the invention has been described and illustrated above, it should be understood that this is exemplary of the invention and is not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for securing a communication between an accounting device and a printer comprising:
   generating a first pseudo-random sequence at said accounting device;
   generating a second pseudo-random sequence at said accounting device;
   combining a portion of said first pseudo-random sequence and said communication to form an encrypted communication, said portion of said first pseudo-random sequence being less than all of said first pseudo-random sequence and being determined based on said second pseudo-random sequence; and
   sending said encrypted communication from said accounting device to said printer.

2. The method according to claim 1, wherein combining a portion of said first pseudo-random sequence and said communication further comprises:
   inputting said portion of said first pseudo-random sequence to a first input of a logic gate;
   inputting said communication to a second input of said logic gate; and
   outputting a result from said logic gate,
   wherein said result is said encrypted communication.

3. The method according to claim 2, wherein said logic gate is an exclusive or gate.

4. The method according to claim 1, wherein generating a first pseudo-random sequence and generating a second pseudo-random sequence further comprises:
   utilizing a first linear feedback shift register to generate said first pseudo-random sequence; and
   utilizing a second linear feedback shift register to generate said second pseudo-random sequence, said second linear feedback shift register being different than said first linear feedback shift register.

5. The method according to claim 4, wherein said first and second linear feedback shift registers each comprises:
   a plurality of registers in series, each of said plurality of registers having an input and an output, at least two of said outputs being coupled to respective inputs of a logic gate, an output of said logic gate being coupled to said input of a first of said plurality of registers, said input of each of the other of said plurality of registers being coupled to said output of a preceding register, said output of a last of said registers providing said pseudo-random sequence.

6. The method according to claim 1, wherein combining a portion of said first pseudo-random sequence and said communication further comprises:
   reading a data bit of said second pseudo-random sequence;
   determining if said read data bit of said second pseudo-random sequence is a first value; and
   utilizing a corresponding bit of said first pseudo-random sequence to form said encrypted communication if said read data bit of said second pseudo-random sequence is said first value.

7. The method according to claim 6, wherein if said read data bit of said second pseudo-random sequence is not said first value, said method further comprises:
   stepping each of said first and said second pseudo-random sequences to a next data bit; and
   repeating said reading, determining and utilizing steps.

8. The method according to claim 1, further comprising:
   generating said first pseudo-random sequence at said printer;
   generating a second pseudo-random sequence at said printer;
   using a portion of said first pseudo-random sequence generated at said printer to decrypt said encrypted communication, said portion of said first pseudo-random sequence generated at said printer that is used to decrypt said encrypted communication being less than all of said first pseudo-random sequence and being determined based on said second pseudo-random sequence generated at said printer; and
   processing said communication.

9. The method according to claim 1, wherein generating a first pseudo-random sequence further comprises:
receiving from said printer at least a portion of an initial fill value for said first pseudo-random sequence, said first pseudo-random sequence being based on said initial fill value.

10. The method according to claim 9, wherein said portion of said initial fill value received from said printer is encrypted with a key derived from a serial number of said printer, and generating said first pseudo-random sequence further comprises:
receiving said encrypted portion of said initial fill value and said serial number from said printer;
determining said key based on said received serial number; and
decrypting said encrypted portion of said initial fill value with said determined key.

11. The method according to claim 1, wherein said communication includes data.

12. The method according to claim 1, wherein said communication includes printer control signals.

13. A method for securing a communication between an accounting device and a printer comprising:
generating a first and second pseudo-random sequence at said accounting device;
encoding said communication utilizing a portion of said first pseudo-random sequence, said portion of said first pseudo-random sequence being less than all of said first pseudo-random sequence and being determined based on said second pseudo-random sequence;
sending said encoded communication from said accounting device to said printer;
generating said first and second pseudo-random sequences at said printer; and
decoding said encoded communication utilizing a portion of said first pseudo-random sequence generated at said printer, said portion of said first pseudo-random sequence generated at said printer utilized being less than all of said first pseudo-random sequence generated at said printer and being determined based on said second pseudo-random sequence generated at said printer.

14. The method according to claim 13, wherein generating a first and second pseudo-random sequence at said accounting device and said printer each further comprise:
utilizing a first linear feedback shift register to generate said first pseudo-random sequence; and
utilizing a second linear feedback shift register to generate said second pseudo-random sequence, said second linear feedback shift register being different than said first linear feedback shift register.

15. The method according to claim 13, wherein before said accounting unit generates said first and second pseudo-random sequences, said method further comprises:
receiving from said printer at least a portion of a first initial fill value for said first pseudo-random sequence, said first pseudo-random sequence being based on said initial fill value.

16. The method according to claim 15, further comprising:
receiving from said printer at least a portion of a second initial fill value for said second pseudo-random sequence, said second pseudo-random sequence being based on said second initial fill value.

17. The method according to claim 16, wherein said portions of said first and second initial fill values received from said printer are encrypted with a key derived from a serial number of said printer, and generating said first and second pseudo-random sequences at said accounting device further comprises:
receiving said encrypted portions of said first and second initial fill values and said serial number from said printer;
determining said key based on said received serial number; and
decrypting said encrypted portions of said first and second initial fill values with said determined key.

18. The method according to claim 13, wherein said communication includes data representing postage indicia accounted for by said accounting device, said method further comprising:
printing said indicia at said printer.

19. A metering device comprising:
an accounting device having a security device and an encryption device coupled to said security device, said encryption device comprising:
a first linear feedback shift register to generate a first pseudo-random sequence;
a second linear feedback shift register to generate a second pseudo-random sequence;
a first logic circuit coupled to receive said first and second pseudo-random sequences, said first logic circuit having an output to output portions of said first pseudo-random sequence, said portions being less than all of said first pseudo-random sequence, based on said second pseudo-random sequence,
wherein communications from said security device are encrypted utilizing said portions of said first pseudo-random sequence output from said first logic circuit before being sent from said accounting device.

20. The metering device according to claim 19, wherein said encryption device further comprises:
a first logic gate having a first input coupled to said security device, a second input coupled to said output of said first logic circuit, and an output to provide said encrypted communications.

21. The metering device according to claim 19, further comprising:
a printing device coupled to said accounting device, said printing device including a decryption circuit comprising:
a third linear feedback shift register to generate said first pseudo-random sequence;
a fourth linear feedback shift register to generate said second pseudo-random sequence;
a second logic circuit coupled to receive said first and second pseudo-random sequences generated by said third and fourth linear feedback shift registers, respectively, said second logic circuit having an output to output portions of said first pseudo-random sequence based on said second pseudo-random sequence,
wherein encrypted communications from said accounting device are decrypted utilizing said portions of said first pseudo-random sequence output from said second logic circuit.

22. The metering device according to claim 21, wherein said decryption circuit further comprises:
a second logic gate having a first input coupled to receive said encrypted communications, a second input coupled to said output of said second logic circuit, and an output to provide said decrypted communications.

23. The metering device according to claim 21, wherein said printing device generates at least a portion of a first initial fill value for said first and third linear feedback shift registers and at least a portion of a second initial fill value for said second and fourth linear shift feedback registers and sends said portions of said first and second initial fill values to said accounting device.

24. The metering device according to claim 23, wherein said first initial fill value is identical to said second initial fill value.

25. The metering device according to claim 23, wherein said printing device sends said portions of said first and second initial fill values to said accounting device in an encrypted form.

26. The metering device according to claim 25, wherein said portions of said first and second initial fill values are encrypted utilizing a key based on a serial number of said printing device, and said printing device sends said serial number to said accounting device.

27. The metering device according to claim 26, wherein said accounting device determines said key based on said serial number of said printing device and decrypts said portions of said first and second initial fill values utilizing said determined key.

28. The metering device according to claim 19, wherein said communications include data.

29. The metering device according to claim 19, wherein said communications include printer control signals.

30. A metering device comprising:
an accounting device having a security device and an encryption device, said encryption device adapted to generate a first pseudo-random sequence and a second pseudo-random sequence, a portion less than all of said first pseudo-random sequence being utilized to encrypt communications being output from said accounting device, said portion of said first pseudo-random sequence being determined based on said second pseudo-random sequence; and
a printing device coupled to said accounting device to receive said encrypted communications, said printing device having a decryption device adapted to generate said first pseudo-random sequence and said second pseudo-random sequence, said decryption device utilizing a portion less than all of said first pseudo-random sequence generated by said decryption device to decrypt said encrypted communications received from said accounting device, said portion of said first pseudo-random sequence used to decrypt said encrypted communications being determined based on said second pseudo-random sequence generated by said decryption device.

31. The metering device according to claim 30, wherein at least one of said encryption device and said decryption device includes a processor.

32. The metering device according to claim 30, wherein said encryption device includes a first processor and said decryption device includes a second processor.

33. A printing device comprising:
an input port to receive communications, said communications being encrypted based on a portion of a first pseudo-random sequence, said portion of said first pseudo-random sequence being less than all of said first pseudo-random sequence and being determined based on a second pseudo-random sequence; and
a decryption device coupled to said input port, said decryption device adapted to generate said first pseudo-random sequence and said second pseudo-random sequence, said decryption device utilizing a portion less than all of said generated first pseudo-random sequence to decrypt said encrypted communications, said portion of said generated first pseudo-random sequence utilized to decrypt said encrypted communications being determined based on said generated second pseudo-random sequence.

34. The printing device according to claim 33, wherein said decryption device further comprises:
a processor to generate at least one of said first and second pseudo-random sequences and to decrypt said encrypted communications.

35. The printing device according to claim 33, wherein said decryption device further comprises:
a first linear feedback shift register to generate said first pseudo-random sequence; and
a second linear feedback shift register to generate said second pseudo-random sequence.

36. The printing device according to claim 33, wherein said printing device generates at least a portion of an initial fill value, said first pseudo-random sequence being based on said initial fill value.

37. The printing device according to claim 36, wherein said printing device encrypts said at least a portion of said initial fill value utilizing a key based on a serial number of said printing device and outputs said encrypted at least a portion of said initial fill value to a device from which said encrypted communications are received.

* * * * *